UNITED STATES PATENT OFFICE.

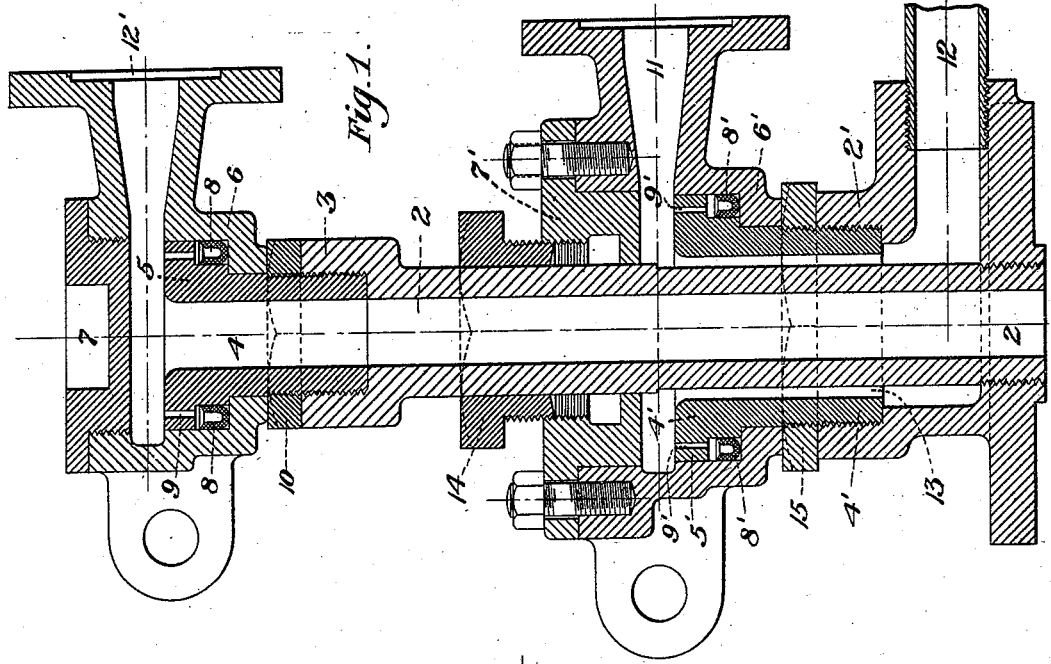

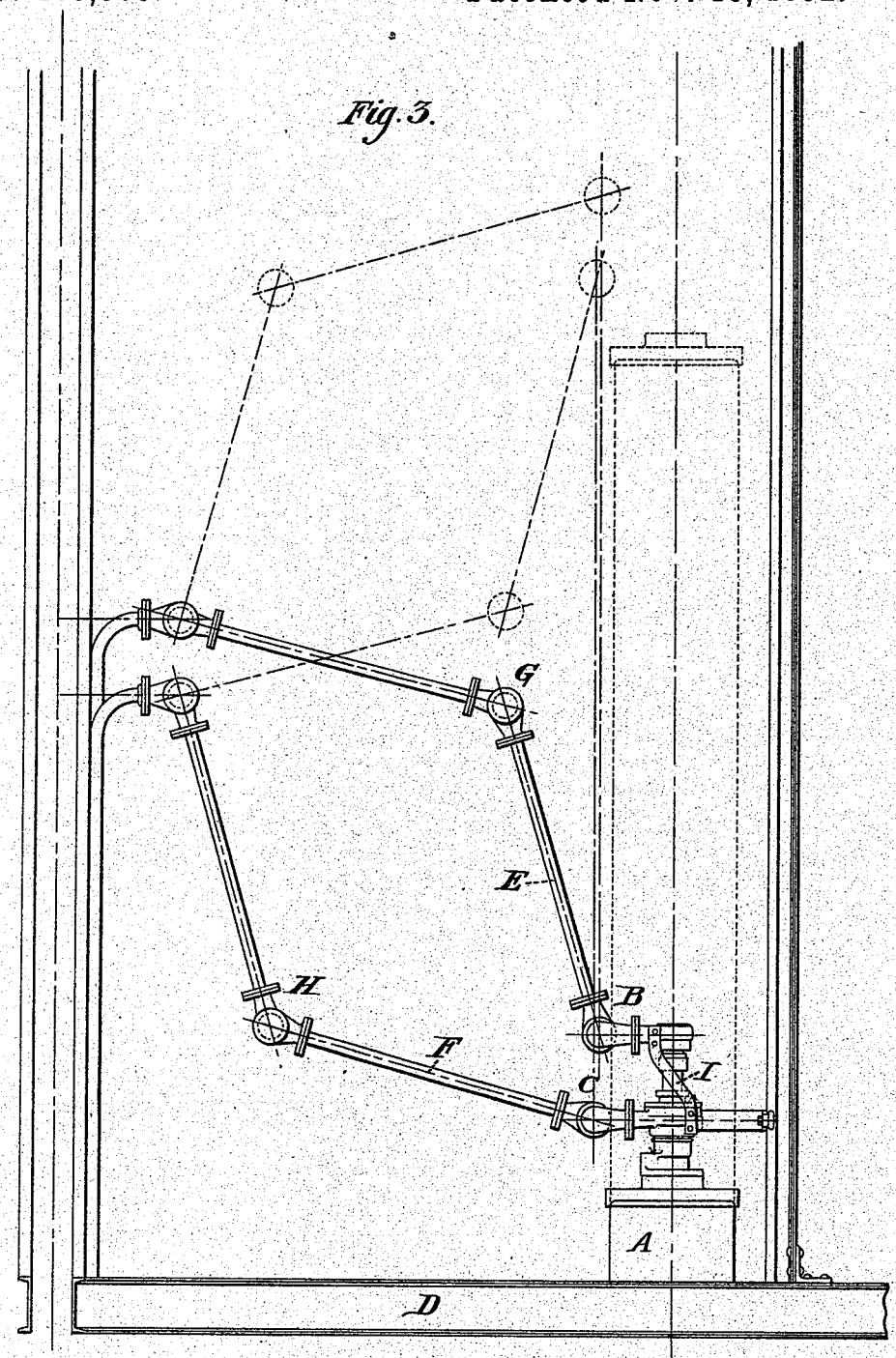

CAMILLE MERCÀDER, OF BRADDOCK, PENNSYLVANIA.

PIPE CONNECTION FOR HYDRAULIC MECHANISMS.

SPECIFICATION forming part of Letters Patent No. 486,383, dated November 15, 1892.

Application filed February 19, 1892. Serial No. 422,106. (No model.)

*To all whom it may concern:*

Be it known that I, CAMILLE MERCÀDER, of Braddock, in the county of Allegheny and State of Pennsylvania, have invented a new and useful Improvement in Pipe Connections for Hydraulic Mechanism, of which the following is a full, clear, and exact description.

The object of my invention is to provide a swivel connection for pipes for conveying steam, water, or other fluid, which shall be simple in construction, which shall not be subject to leak, and which shall not require frequent repair, as do the swivel-joints now commonly known and used.

The preferred construction of my improvement is described in this specification. The items of invention for which I desire protection are summarized in the claims.

My invention is capable of general use in connection with cranes or other hydraulic or steam-operated mechanism.

In Figure 1 I illustrate my invention as applied to the top water connection of a crane, the parts being shown in vertical axial section. Fig. 2 is a sectional view of a swivel-joint adapted for use on a swinging water-pipe. Fig. 3 is a side elevation showing the top portion of a crane having my improved water connections.

In Fig. 1 I show in the same structure two swivel-joints embodying my invention. 2 represents a pipe set in the axis of the crane-journal, terminating at the upper end in a nipple 3. 4 is a swivel-neck, which is screwed into the nipple 3 and is provided at its end with an annular flange or enlargement 5. 6 is a box or pipe which fits around the swivel-neck and is itself fixed, being coupled at 12' to the water-supply pipe of the crane. Its outer end may be closed by a screw cap or plug 7, and a nut 10 is preferably interposed between its end and the end of the nipple 3. The flange 5 is formed with a peripheral recess in which is placed a cup packing-ring 8, having an end bearing on a shoulder on the interior of the swivel-box against which the flange fits, and in order to expand this packing there are water-inlets 9, which extend into the recess from the water-passage of the joint, so that as the water passes into the cup-packing it will expand it and will cause it to seal the joint. When the parts are thus constructed, the pipe 2 is free to rotate, the swivel-neck 4 then turning within the box, the joint being made tight by the packing-ring and the base of the flange on the swivel-neck being pressed against the shoulder in the box with a pressure depending on the width of that part of the flange between the packing and the interior wall of the box. The parts of the lower swivel-joint shown in this figure are designated by the same reference-figures as the corresponding parts of the upper joint, being distinguished by the prime-mark, ('.) By means of this second joint I form a water-passage extending axially of the crane-journal and leading from a fixed pipe connection 11 to a pipe connection 12, which rotates with the crane. 2' is a hollow box or casting corresponding in function with the pipe 2 and having a lateral passage communicating with the pipe 12. 4' is the swivel-neck, which is screwed in a nipple on the part 2' and has an annular flange 5', which is seated on an internal shoulder in an inclosing swivel-box 6' and has a peripheral recess containing an annular cup-packing 8'. The flange is formed with water-passages 9', leading to the interior of the cup-packing. The swivel-box 6' is provided with a removable closing-cap 7', which is of sufficient diameter to permit insertion of the swivel-neck 4'. The pipe 2 passes axially through the cap, through the swivel-neck, and may be fixed to the part 2', so as to be rotatory therewith, there being a water-passage 13 in the swivel-neck 4' surrounding the pipe 2 and communicating with the pipe 12, as shown. A stuffing-box and gland 14 close the joint between the pipe 2 and cap 7'. 10 is an annular nut interposed between the ends of the parts 2' and 6'. When thus constructed, the part 2' is free to rotate with the pipe 2, the swivel-neck 4' turning freely within the box 6', the packing 8' being expanded by the water-pressure and closing the joint, and the flange 5' being held by the water-pressure against the shoulder in the swivel-box.

In this specification I intend, in addition to the broad claims relating to the general construction of the swivel-joint, to claim the specific arrangement of the parts shown in Fig. 1, by which a double water-passage in the axis of the crane-journal is afforded.

Referring now to Fig. 2, it shows a swivel-joint adapted to be applied to the walking supply-pipe of an hydraulic crane and constructed on the same principle as the swivel-joints of Fig. 1. 6ª represents the swivel-box or pipe connection, having a water-passage adapted to be connected at 12ª to one of the water-pipes of the crane or other machine. 4ª is the swivel-neck, which fits within the box 6ª, so as to be rotatory axially, and is provided with an annular flange 5ª, which has a seat against an inner shoulder on the box 6ª, and is provided with an annular recess, a cup-packing 8ª, fitting on said shoulder. 9ª are passages leading through the flange 5ª, and adapted to supply water to the cup-packing. 7ª is a removable plug or cap at the end of the swivel-box, the opening closed thereby being of sufficient diameter to permit insertion of the swivel-neck 4ª. 2ª is a second swivel-box or pipe connection, adapted to be connected at the end to the second branch of the main water-pipe. The swivel-neck 4ª is screwed into and fixed in the box 2ª, so that their water-passages shall communicate as shown. 10ª is a nut interposed between the ends of the parts 2ª and 6ª and screwed upon the swivel-neck 4ª, being adapted thereby to lock and prevent the part 4ª from turning within the part 2ª. When the device is thus constructed and arranged, the parts 2ª and 4ª, being attached together, are adapted to turn freely on the axis of the swivel-neck 4ª, the joint between the parts 2ª and 4ª being sealed by the expansion of the packing 8ª, and the flange 5ª being held by water-pressure against the part 6ª.

In Fig. 3, A is the top portion of a vertically-movable and rotatory crane-mast; B C, the two swivel-joints shown in Fig. 1; D, the beams of a building in which the crane is situate. E F are walking-pipes provided with swivel connections G H and connected to the swivel-joints B and C. When the crane is moved vertically, a considerable strain is put upon the joints of the pipes, which tends to tilt the swivel connections B C and which if uncorrected would impair their action. To overcome this, I use a rigid strap I, which connects the swivel-box of the joint B at one side of its center with the swivel-joint of the other box at the opposite side of its center. The two boxes thus counterbalance each other and the tipping tendency of each is restrained by the other.

The advantages of my invention will be appreciated by those skilled in the art. Within the scope of the invention, the device may be modified in many ways in respect of the form and relative arrangement of the parts and such modifications are intended to be covered in the following claims:

I claim—

1. In a swivel-joint, the combination of an interfitted swivel-box and swivel-neck, one having a flange and the other a shoulder against which the flange fits, a packing-ring set in a recess between the swivel-box and swivel-neck, a removable end cap, a pipe connection to which the swivel-neck is screwed, and an interposed locking-nut, substantially as and for the purposes described.

2. In a water-supply for crane-journals, the combination of a central pipe and, surrounding the same, a swivel-box and swivel-neck having flanges or shoulders adapted to be forced against each other by water-pressure, a packing-ring between said swivel-box and swivel-neck, a removal cap, and a stuffing-box, substantially as and for the purposes described.

3. The combination of two adjacent jointed pipes, swivels to which they are connected, and a counterbalancing connection between opposite sides of said swivels, substantially as and for the purposes described.

In testimony whereof I have hereunto set my hand this 13th day of February, A. D. 1892.

CAMILLE MERCÀDER.

Witnesses:
THOMAS W. BAKEWELL,
W. B. CORWIN.